C. A. PARSONS & S. S. COOK.
FORMATION OF GEAR WHEEL TEETH.
APPLICATION FILED NOV. 6, 1916.

1,220,543.

Patented Mar. 27, 1917.

Inventor:
Charles A. Parsons
Stanley S. Cook,
By Spear, Middleton, Donaldson & Spear
Atty's

UNITED STATES PATENT OFFICE.

CHARLES ALGERNON PARSONS, OF NEWCASTLE-UPON-TYNE, AND STANLEY SMITH COOK, OF WALLSEND, ENGLAND; SAID COOK ASSIGNOR TO SAID PARSONS.

FORMATION OF GEAR-WHEEL TEETH.

1,220,543.  Specification of Letters Patent.  Patented Mar. 27, 1917.

Original applications filed March 25, 1913, Serial No. 756,760, and June 24, 1916, Serial No. 105,756. Divided and this application filed November 6, 1916. Serial No. 129,884.

*To all whom it may concern:*

Be it known that we, CHARLES ALGERNON PARSONS, a subject of the King of Great Britain and Ireland, and residing at Heaton Works, Newcastle-upon-Tyne, in the county of Northumberland, England, and STANLEY SMITH COOK, a subject of the King of Great Britain and Ireland, and residing at Turbinia Works, Wallsend-on-Tyne, in the county of Northumberland, England, have invented certain new and useful Improvements in and Relating to the Formation of Gear-Wheel Teeth, of which the following is a specification.

This invention relates to the method of and means for forming the teeth of gear wheels such as are described in the copending application Serial No. 105,756, filed 24th June, 1916.

Referring to the accompanying drawings:—

Figure 1:
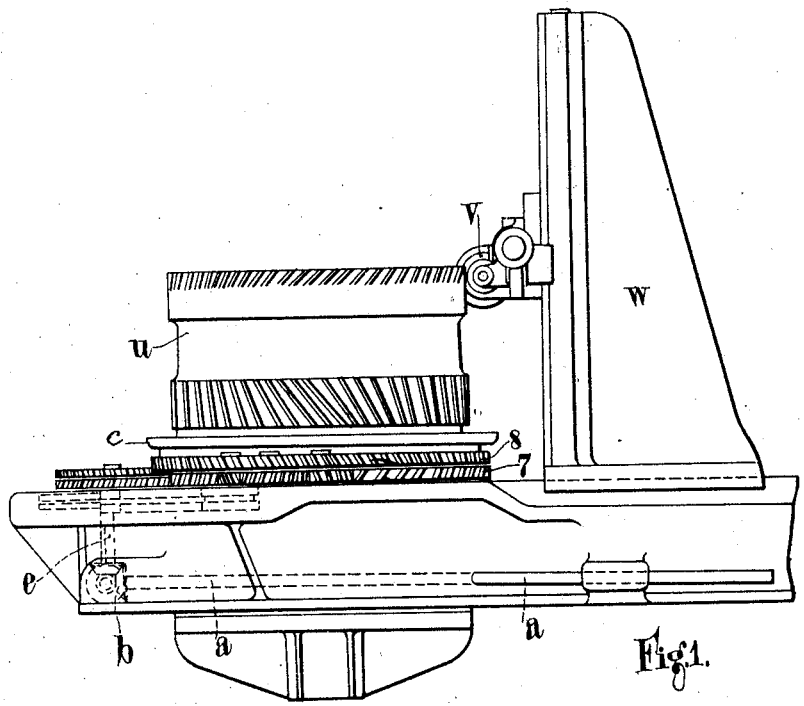
Figure 1 is a side elevation.
Figure 2:
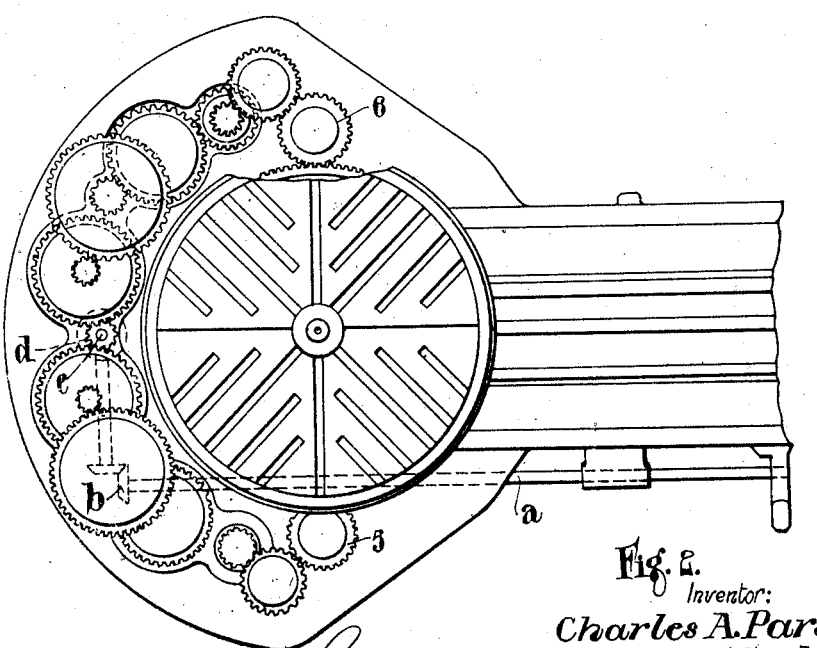
Fig. 2 is a plan of a portion of a gear cutting machine embodying the present invention.

In carrying the invention into effect, the work $u$ is mounted on a table $c$ to which are attached two driving spur wheels 7 and 8. These spur wheels are driven by pinions 5 and 6. The wheels 7 and 8 preferably have single helical teeth and trains of helical spur wheels and pinions are carried around to the front of the machine where they engage with a pair of pinions $d$ mounted upon a common vertical shaft $e$. These latter pinions are of opposite hand and the shaft $e$ being allowed a certain small longitudinal freedom, a differential action takes place so that these pinions transmit equal force to the two trains and consequently to the two wheels 7 and 8. In this manner the angular movement of the work $u$ is made to register with the average configuration of the parent gears 7 and 8, and consequently the errors which would be introduced by any of the separate drives are eliminated or at least greatly reduced. The power is transmitted to the vertical shaft $e$ through the shaft $a$ and bevel wheels $d$.

It will be seen that the relative position of the member $v$ forming the teeth and the wheel on which the teeth are being formed is determined by the general or average configuration of the members 7 and 8 of the parent gear.

Having now described our invention, what we claim as new and desire to secure by Letters Patent, is: —

1. In combination in a gear cutting machine, a work table, spiral gear wheels attached to said table, spiral gear driving means engaging said wheels, a power shaft adapted to rotate and free to move longitudinally, a pair of pinions of opposite angle secured upon said shaft and acting to connect said shaft to said spiral driving means.

2. In combination in a gear cutting machine, a work table, spiral gear wheels attached to said table, spiral gear driving means engaging said wheels, a power shaft adapted to rotate and free to move longitudinally, gear means of opposite angle secured upon said shaft and acting to connect said shaft to said spiral driving means.

In testimony whereof, we have affixed our signatures.

CHARLES ALGERNON PARSONS.
STANLEY SMITH COOK.